United States Patent [19]

Chattha

[11] 4,424,334

[45] Jan. 3, 1984

[54] HIGH SOLIDS URETHANE COATINGS FROM NEW TETRAHYDROXY OLIGOMERS

[75] Inventor: Mohinder S. Chattha, Livonia, Mich.

[73] Assignee: Ford Motor Company, Dearborn, Mich.

[21] Appl. No.: 334,799

[22] Filed: Dec. 28, 1981

[51] Int. Cl.³ .................... C08G 18/32; C08G 18/42; C08L 63/02

[52] U.S. Cl. ........................ 528/77; 525/438; 525/528; 528/60; 528/75; 528/79; 528/81

[58] Field of Search ............... 525/438, 528; 528/60, 528/77, 79, 81, 75

[56] References Cited

U.S. PATENT DOCUMENTS

| | | | |
|---|---|---|---|
| 3,173,971 | 3/1965 | Roth et al. | 525/514 |
| 3,719,725 | 3/1973 | Murakami et al. | 525/443 |
| 4,314,918 | 2/1982 | Birkmeyer | 525/579 |
| 4,316,940 | 2/1982 | Thornley | 525/438 |

*Primary Examiner*—Theodore E. Pertilla
*Attorney, Agent, or Firm*—Lorraine S. Melotik; Roger L. May

[57] ABSTRACT

A novel tetrahydroxy oligomer crosslinkable with polyisocyanates to form a coating composition adapted for use as an automative topcoat and which upon curing forms a hard, glossy, coating with outstanding durability and excellent resistance to solvents and water. The coating composition comprises:

(A) a tetrahydroxy oligomer having a number average ($M_n$) molecular weight of between about 600–2000 and being the reaction product of:
 (i) an ester containing pendant hydroxyl and carboxyl functionality and being made by reaction of reactants consisting essentially of:
  (a) a $C_3$–$C_{10}$ aliphatic diol, and
  (b) an alkyl hexahydrophthalic anhydride, wherein (a) and (b) are combined in the reaction mixture in an amount sufficient to allow reaction in about a 1:1 molar ratio; and
 (ii) a diepoxide having a number average molecular weight between about 130–1500, wherein (i) and (ii) are combined in the reaction mixture in an amount sufficient to allow reaction in about a 2:1 molar ratio,
(B) a polyisocyanate crosslinking agent;
(C) optionally a hydroxyl functional additive; and
(D) solvent.

The polyisocyanate crosslinking agent having two or more reactive isocyanate groups per molecule is included in the composition in an amount sufficient to provide between about 0.50 and about 1.6 reactive isocyanate groups per hydroxyl group present in the composition either on the tetrahydroxy oligomer or as a hydroxyl group of the hydroxy functional additive.

15 Claims, No Drawings

HIGH SOLIDS URETHANE COATINGS FROM NEW TETRAHYDROXY OLIGOMERS

Reference is made to commonly assigned and concurrently filed U.S. application Ser. Nos. 334,685 entitled "New Polyhydroxy Oligomers for High Solids Coatings I" 334,801 entitled "New Polyhydroxy Oligomers for High Solids Coatings II", 334,800 entitled "High Solids Coatings from New Tetrahydroxy Oligomers", 334,686 entitled "New High Solids Urethane Coatings I", and 334,802 entitled "New High Solids Urethane Coatings II", all to Chattha.

This invention relates to novel coating compositions. More particularly, the invention relates to high solids thermosetting coating compositions which are adapted to provide an automotive topcoat demonstrating hardness, high gloss, outstanding durability and excellent resistance to solvents and water, and which comprises novel tetrahydroxy oligomers crosslinkable with polyisocyanates. Most particularly, this invention relates to high solid compositions wherein the novel tetrahydroxy oligomers are made by first reacting a low molecular weight branched diol with an alkyl hexahydrophthalic anhydride to form a hydroxy acid ester which is subsequently reacted with a low molecular weight diepoxide.

BACKGROUND OF THE INVENTION

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance.

The coating compositions of this invention combine the above discussed desired properties and low application viscosity so as to overcome deficiencies of previously proposed high solids materials. In particular, these low viscosity high solids coating compositions exhibit excellent weathering properties making them ideally suitable for automotive topcoats, clear or pigmented, including metallic flake.

BRIEF DESCRIPTION OF THE INVENTION

The thermosetting coating composition of this invention preferably contains greater than about 60% by weight, more preferably greater than 70% by weight, of nonvolatile solids, and exhibits superior weathering to other high solids two component paints. The composition comprises:

(A) a tetrahydroxy oligomer having a number average ($M_n$) molecular weight of between about 600–2000 and being the reaction product of:
  (i) an ester containing pendant hydroxyl and carboxyl functionality and being made by reacting:
    (a) a $C_3$–$C_{10}$ aliphatic branched diol, and
    (b) an alkyl hexahydrophthalic anhydride, wherein (a) and (b) are combined in the reaction mixture in an amount sufficient to allow reaction in about a 1:1 molar ratio; and
  (ii) a diepoxide having a number average molecular weight between about 130–1500, wherein (i) and (ii) are combined in the reaction mixture in an amount sufficient to allow reaction in about a 2:1 molar ratio;

(B) a polyisocyanate crosslinking agent, having two or more reactive isocyanate groups per molecule;
(C) 0–50 weight percent based on the total weight of (A), (B), (C) and (D) of a hydroxy functional additive having a number average molecular weight ($\overline{M}_n$) of between about 150 to 6000, preferably between about 400 to 2500; and
(D) solvent The polyisocyanate crosslinking agent is included in the composition in an amount sufficient to provide between about 0.50 and about 1.6, preferably between about 0.80 and 1.3 reactive isocyanate groups per hydroxyl group included in the composition either on the tetrahydroxy oligomer or as a hydroxyl group of the hydroxy functional additive. The oligomers of this composition are compatible, in particular, with low molecular weight hydroxyl functional acrylics. In addition, the high solids coating composition of this invention may include additives such as catalysts, antioxidants, U.V. absorbers, flow control or wetting agents, antistatic agents, pigments, plasticizers, etc. The oligomers of this composition are also compatible with nonaqueous dispersions (NAD's), which are generally used as flow control additives.

DETAILED DESCRIPTION OF THE INVENTION

The coating composition of this invention provide a system which is particularly suitable for those applications requiring a coating having high gloss, hardness, durability and high solvent and water resistance as well as low temperature cure. The desirable characteristics of the coating composition of this invention, in particular the excellent physical properties and weatheribility, are believed to result from the steric hinderance to hydrolysis afforded the ester groups of the oligomer by the alkyl group of the anhydride. However, while this theory has been advanced, to explain the excellent durability of this coating composition, neither its validity nor its understanding is necessary for the practice of the invention.

Each of the components of the coating composition, the amounts of each of the components required to achieve the desired results of the invention and a method for applying the composition are described hereinafter in greater detail.

Tetrahydroxy Oligomer

A principal material in the coating composition of this invention is a novel tetrahydroxy oligomer having a number average molecular weight ($\overline{M}_n$) between about 600 and about 2000, more preferably between about 700 and about 1500. The oligomer is prepared by first combining a low molecular weight $C_3$–$C_{10}$ aliphatic branched diol with an alkyl hexahydrophthaic anhydride in the reaction mixture in an amount sufficient to allow reaction in about a 1:1 molar ratio to form an ester having pendant hydroxyl and pendant carboxyl functionality. A slight excess of anhydride than needed for this reaction may be used. This ester is subsequently reacted with a diepoxide; the ester and the diepoxide being combined in the reaction mixture in an amount sufficient to allow reaction in about a 2:1 molar ratio, forming the oligomer. By means of this reaction, the carboxyl of the ester opens the epoxide groups of the diepoxide generating two more hydroxyl functionalities.

The aliphatic branched diol preferably contains only one primary hydroxyl group, the second hydroxyl of the diol is therefore preferable a secondary or tertiary hydroxyl, more preferably a secondary hydroxyl. Additionally it is preferable that the hydroxyl groups not be on adjacent carbons and more preferably be separated by at least three carbon atoms. The carbon chain may also be interrupted or substituted by non-interfering functionalilty. Suitable $C_3$–$C_{10}$ aliphatic branched diols include but are not limited to, 2-ethyl-1,3-hexane diol, 1,3-butanediol and 1,2-butane-diol with 2-ethyl-1,3-hexanediol being most preferred. Other suitable diols will be apparent to one skilled in the art. Mixtures of suitable diols can also be used.

The alkyl hexahydrophthalic anhydride preferably contains a lower alkyl group, i.e., an akyl group having about up to seven carbons, more preferably, up to about four carbons. Additionally, the alkyl group may be substituted by non-interfering functionality. Suitable anhydrides useful in this invention include methyl hexahydrophthalic anhydride, and its ethyl and propyl analogs, with methyl hexahydrophthalic anhydride being most preferred.

The diepoxide suitable for use in this invention is a low molecular weight epoxy containing two epoxide groups per molecule and has a number average molecular weight of between about 130–1500. This diepoxide can be a liquid or a solid and can be either a single diepoxide or a mixture of suitable diepoxides. Examples of suitable diepoxides include but are not limited to condensation products of bisphenol-A with epichlorohydrin, examples of which are commercially available as Epon 828, 1001, 1004, 1007 and 1009 (marketed by Shell Oil Company), Araldite 6010 and 8001 (marketed by Ciba-Geigy); ester-type diepoxides such as diglycidyl phthalate, diglycidyl adipate, and diglycidyl glutarate; cycloaliphatic diepoxides such as dicycopentaxediene and vinyl cyclohexane dioxide and aliphatic ether type diepoxides such as ethylene glycol, diglycidyl ether, 1,2-propylene glycol diglycidyl ether and 1,4-butanediol diglycidyl ether (Araldite RD-2 marketed by Ciba-Geigy).

In preparing the tetrahydroxy oligomer, the diol and anhydride are combined, generally by adding the anhydride dropwise to the heated diol, and then reacted at an elevated temperature for a time necessary to complete the esterification reaction. Subsequently, the diepoxide is reacted with the ester composition, generally in the presence of a catalyst, and the composition is maintained at elevated temperatures until the reaction between the hydroxy acid ester and diepoxide is complete. Preferred carboxyl/epoxide catalysts useful in preparation of hydroxy functional oligomer are the tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylaniline, quinoline, β-picoline, ethylpyridine; and the like. Still other catalyst known to catalyze carboxy/epoxy reactions will be apparent to those skilled in the art.

Various mixtures of these types of oligomers may also be employed within the scope of the compositions of the invention described herein.

Although the above reactions may be carried out with or without solvent, it is generally suitable and preferable in order to achieve the preferred high solids concentration of the coating composition to use little or no solvent. However, when desirable, suitable solvents which may be employed include those commonly used, such as toluene, xylene, methyl amyl ketone, etc. It is however necessary to incorporate solvent into the coating composition in order to facilitate application of the coating composition. Typically solvents useful in the coating composition to facilitate application, for example spray application at high solids content, include those commonly employed, such as toluene, xylene, methyl amyl ketone, acetone, dioxane, butanone, 1-ethanol, 2-butoxyl-1-ethanol, diacetone alcohol, tetrahydrofuran, butyl acetate, cellosolve acetate, dimethyl succinate, dimethyl glutarate, dimethyl adipate or mixtures thereof. The solvent in which the tetrahydroxy functional oligomer of the coating composition may be prepared, may be employed as the solvent for the coating composition thus eliminating the need for drying the oligomer after preparation, if such is desired. As mentioned above, the nonvolatile solids content of the high solids coating composition is preferably at least 60% and more preferably 70% or more, thus limiting the amount of solvent included in the composition. However, while the tetrahydroxy oligomer of the subject composition are particularly suitable for making high solids coatings, they are also suitable in compositions that are not high solids compositions. Determination of optimal solids content (with the corresponding solvent content) for a given application would be within the skill of one in the art.

The other major component or the thermosetting, coating composition of the invention is a polyisocyanate, i.e., a compound having 2 or more, preferably 3 or more, reactive isocyanate groups per molecule. This polyisocyanate crosslinking agent is included in the compositions of the invention in an amount sufficient to provide between about 0.5 and about 1.6 preferably between about 0.8 and about 1.3, reactive isocyanate groups per hydroxy group in the composition. Most preferably the crosslinking agent is included in an amount sufficient to provide about 1.1 isocyanate groups per hydroxyl group in the composition.

Polyisocyanates are well known in the art and numerous suitable isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which may be employed are (1) aliphatic diisocyanates such as trimethylene diisocyanate, tetramethylene diisocyanate, pentamethylene diisocyanate, hexamethylene diisocyanate, 1,2 propylene diisocyanate, 1,2 butylene diisocyanate, 2,3 butylene diisocyanate, 1,3 butylene diisocyanate, ethylidene diisocyanate, butylidene diisocyanate, 4,4′bis (isocyanate hexyl) methane, bis(2-isocyanate-ethyl) fumarate, 2,6-diisocyanate methyl caproate, 2,2,4(2,4,4)-trimethylhexamethylene diisocayanate, and dimer acid diisocyanates; (2) cycloaliphatic diisocyanates such as 1,3 cyclopentane diisocyanate, 1,4 cyclopentane diisocyanate, 1,2 cyclopentane diisocyanate, and methylcyclohexylene diisocyanate; (3) aromatic diisocyanates such as m-phenylene diisocyanate, p-phenylenediisocyanate, 4,4'diphenyl diisocyanate, 1,5 methylene diisocyanate, 1,4 napthalene diisocyanate; (4) aliphatic/aromatic diisocyanates such as 4,4'diphenylenemethane diisocyanates, 2,4 or 2,6 tolylene diisocyanate, 4,4'toluidene diisocyanate, 1,4 xylylene diisocyanate; (5) nuclear substituted aromatic compounds such as dianisidine diisocyanate, 4,4'diphenylether diisocyanate, chlorodiphenylene diisocyanate; (6) triisocyanates such as triphenylmethane 4,4', 4, 4" triisocyanate, 1, 3, 5 triisocyanate benzene, 2,4, 6 triisocyanate toluene; (7) tetraisocyanates such as 4,4' diphenyl dimethylmethane 2,2', 5,5' tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triol, pentaerythritol and the like, as well as monoethers, e.g. diethylene glycol, tripropylene glycol and the like and polyethers, i.e., alkylene oxide condensates of the above.

Especially preferred for use in the compositions of the invention are trimerized products of aliphatic diisocyanates such as 1,6 hexamethylene diisocyanate. Still another particularly preferred type of crosslinking agent is a polyisocyanate having a biuret structure. This type of polyisocyanate is well known as are methods for making the same. One such polyisocyanate crosslinking agent is a high molecular weight biuret of 1,6 hexamethylene diisocyanate sold by Mobay Chemical Company under the tradename Desmodur N. Exemplary of other biuret type polyisocyanates are those prepared in accordance with U.S. Pat. No. 3,976,622 to Wagner et al.

OPTIONAL HYDROXY FUNCTIONAL ADDITIVE

Additional hydroxy functionality other than that present on the tetrahydroxy oligomer may be achieved by adding a hydroxy functional additive in amounts up to about 50 weight percent based on the total weight of the composition. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful in the invention preferably are selected from the group consisting of: (i) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one of which bears hydroxy functionality and which is included in the copolymer in an amount ranging from about 10 to about 50 weight percent, and (vi) mixtures of (i)-(v).

U.S. Pat. No. 4,181,784 to Chattha et al teaches a high solids paint composition comprising an optional hydroxy functional additive. This patent is hereby expressly incorporated by reference as detailing hydroxy functional additives which are suitable for use as such in the composition of this invention. The following presents a brief description of the optional hydroxy functional additives.

The hydroxy functional polyesters useful in the invention are preferably fully saturated products prepared from aliphatic dibasic acids containing 2–20 carbon atoms, and short chain glycols of up to and including 21 carbon atoms. The molecular weight of these materials ranges from about 200 to about 2500 and the hydroxyl number ranges from about 30 to about 230.

Among preferred polyesters are products derived from esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

Oligoester (i) prepared by reacting a dibasic carboxylic acid with a monoepoxide, preferably include those formed by reacting $C_6$–$C_{12}$ dicarboxylic aliphatic acids with ethylene oxide or propylene oxide.

The preparation of oligoesters from carboxylic acids and polyepoxides is well known and is described, for example, in U.S. Pat. Nos. 2,456,408 and 2,653,141. Numerous hydroxy functional oligoesters within this general category wil be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed from monoethylenically usaturated monomers, with between about 10 and about 50 weight percent bearing hydroxyl functionality.

Although one of ordinary skill in the art will recognize that many different hydroxy bearing monomers could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the hydroxy functional copolymer, i.e., between about 90 and about 50 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Other Materials

In addition to the above discussed components, other materials may be included in the coating compositions of the invention. These include materials such as catalysts, antioxidants, U.V. absorbers, surface modifiers and wetting agents as well as pigments.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifiers or wetting agent is dependent upon the type of surface to be coated and selection of the same is clearly within the skill of the artisan.

The coating composition of the invention also may include pigments. As noted above, the compositions of this invention may include metallic flake as a pigment. The amount of pigment in the coating composition may vary, but preferably is between about 3 and about 45 weight percent based on the total weight of the paint composition. If the pigment is metallic flake, the amount ranges from about 1 to about 20 weight percent.

For many application of the coating composition of the invention, particularly high solids composition, it may be desirable to employ flow control additives to provide sag free coatings. Among numerous such materials NAD's such as described by Porter (S. Porter, Jr., and B. N. McBane, U.S. Pat. No. 4,025,474, May 24, 1977) are compatible with these oligomers coating compositions. These particle dispersions may be included in an amount up to 15% by weight of the total composition. Other types of NAD's such as described by D. L. Maker and S. C. Peng (U.S. Pat. No. 3,814,721, June 4, 1974) also may be included in the paint composition.

APPLICATION TECHNIQUES

The coating composition can be applied by conventional methods known to those in the art. These methods include roller coating, spray coating, dipping or brushing and, of course, the particular application technique chosen will depend on the particular substrate to be coated, the environment in which the coating operation is to take place, and the pot life of the composition.

A particularly preferred technique for applying the high solids coating compositions, particularly when applying the same to automobiles as topcoats, is spray coating through the nozzle of a spray gun. In accordance with this preferred technique, the tetrahydroxy oligomer and the optional hydroxy functional copolymer along with other additives such as pigments, U.V. absorbers, antioxidants and other nonreactive materials are admixed with a solvent. These materials are fed as one component of a two component system into a spray gun which combines the materials as they are sprayed onto the automotive substrate. The other material is the isocyanate crosslinking agent, which may or may not be cut with a suitable nonreactive solvent.

High solids paints have in the past caused some difficulty in spray coating techniques because of the high viscosity of the materials and resultant problems in clogging of spray guns. However, because the compositions of this invention demonstrate relatively low viscosity considering the high solids content they can be applied by spray coating techniques.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

2-ethyl-1,3-hexanediol (2920 g) is placed in a 12 liter round bottom flask and 3360 grams methylhexahydrophthalic anhydride is added to it dropwise at 100° C. After the addition is complete, the stirring is continued at 100° C. for two hours and 1,4 butanedioldiglycidyl ether (2680 g) containing three grams of Cordova Accelerator AMC TM -2* is added dropwise with continuous stirring. After the addition is complete, the reaction mixture is heated at 100° C. for 3 hours and then at 165° C. for 4 hours. The resulting product is allowed to cool to 60° C. and then it is dissolved in 990 grams of butyl acetate. Sixty two (62) parts of the above oligomer solution, 51 parts of Desmodur-N-100 (Mobay Chemical Co.) and 0.6 parts of dibutyltin dilaurate are dissolved in 37 parts of n-butyl acetate. The resulting formulation is applied immediately by spraying to primed steel panels which are baked at 110° C. for 18 minutes to obtain coatings with excellent gloss, hardness, adhesion and solvent (xylene and methyl ethyl ketone) resistance.
*available from Cordova Chemical Company.

EXAMPLE 2

Seven (7) parts of aluminum flakes (65% in naphtha) are mixed with 51 parts of the oligomer from Example 1 and 28 parts of n-butyl acetate. Forty-two (42) parts of Desmodur-N-100 (Mobay Chemical Co.) and 0.5 parts of dibutyltin dilaurate are added to the above mixture. The resulting formulation is applied by spraying to primed steel panels which are baked at 110° C. for 19 minutes to obtain silver metallic coatings with excellent hardness, adhesion and solvent (xylene and methyl ethyl ketone) resistance.

EXAMPLE 3

One hundred and two parts of the oligomer from Example 1 are dissolved in 135 parts of methyl amyl ketone and 425 parts of titanium dioxide are added under agitation to this solution. The resulting mixture is whipped with a Cowl's blade at 90 cycles per second for 15 minutes to obtain a Hegman grind fineness of 7. The resulting millbase is filtered through a coarse filtering cloth.

Forty two parts of the above millbase, 31 parts of the oligomer from Example 1, 19 parts of butyl acetate and 0.28 parts of dibutyltin dilaurate are taken up in a plastic bottle. In a separate bottle, 31.5 parts of Desmodur-N-100 (Mobay Chemical Co.) are dissolved in 19 parts of methyl amyl ketone and the resulting solution is added to the first bottle. The formulation is well shaken and is spray applied to primed steel panels. The panels are baked at 100° C. for 20 minutes to obtain white coatings with excellent physical properties.

EXAMPLE 4

Fifty one (51) parts of the oligomer from Example 1, 64 parts of isophoronediisocyanate adduct T 1890(v) (Veba Chemie AG) and 0.55 parts of dibutyltin dilaurate are dissolved in 52 parts of n-butyl acetate. The resulting formulation is applied by spraying to primed steel panels. The panels are baked at 105° C. for 19 minutes to obtain coatings with excellent gloss, hardness, adhesion and solvent resistance.

EXAMPLE 5

A hydroxy acrylic copolymer is prepared from the following monomers:

|  | Wt. gram |
|---|---|
| Butyl methacrylate | 500 |
| Hydroxypropyl methacrylate | 250 |
| Methyl methacrylate | 200 |
| Styrene | 50 |

Fifty (50) grams tert-butyl perbenzoate is added to the above monomer mixture and the resulting solution is added dropwise to 750 grams of refluxing methyl amyl ketone under nitrogen. The heating and stirring is continued for one half hour after the addition is complete and then two grams of tert-butyl perbenzoate are added portionwise to the reaction mixture. The reaction mixture is refluxed for an addition one hour and is then allowed to cool to room temperature.

Fifteen (15) parts of the above polymer solution, 6 parts of isophoronedisocyanate, 0.15 parts of dibutyltin dilaurate and 7 parts of n-butyl acetate are added to the composition described in Example 4. The resulting formulation is applied by spraying to primed steel panels which are baked at 100° C. for 20 minutes to obtain coatings with excellent physical properties.

EXAMPLE 6

Fifty (50) parts of hydroxy oligomer from Example 1, 7 parts of caprolactone based hydroxy ester PCPO 300 (Union Carbide) and 0.6 parts of dibutyltin dilaurate are dissolved in 21 parts of n-butyl acetate. In a separate bottle, 47 parts of Desmodur-N-100 are dissolved in 22 parts of methyl amyl ketone and this solution is added to the hydroxy oligomer solution. The resulting formulation is applied by spraying to primed steel panels which are baked at 115° C. for 16 minutes to obtain coatings with excellent physical properties.

EXAMPLE 7

1,3-butanediol (180 g) is placed in round bottom flask and 336 grams methylhexahydrophthalic anhydride is added to it portionwise. The reaction mixture is warmed to 100° C. and stirred at this temperature for two hours. 1,4-butanediol (202 g) is added dropwise with continuous stirring. The reaction mixture is stirred at 100° C. for three hours and then at 160° C. for two hours.

Forty-two (42) parts of the above product, 45 parts of Desmodur-N-100 (Mobay Chemical Co.) and 0.45 parts of dibutyltin dilaurate are dissolved in 37 parts of n-butyl acetate. The resulting formulation is applied by spraying to primed steel panels which are baked at 110° C. for 18 minutes to obtain coatings with excellent hardness, adhesion and solvent resistance.

EXAMPLE 8

By following the procedure outlined in Example 1, hydroxy oligomer is prepared by employing 146 g 2-ethyl-1,3-hexanediol, 168 methylhexahydrophthalic anhydride, 205 g cycloaliphatic epoxy Araldite CY-178 (Ciba-Giegy Corp.) and 1 g of Cordova Accelerator AMC TM -2.

Forty seven (47) parts of the above oligomer, 38 parts of Desmodur-N-100 (Mobay Chemical Co.) and 0.5 parts of dibutyltin dilaurate are dissolved in 41 parts of n-butyl acetate. The resulting formulation was applied by spraying to primed steel panels which are baked at 115° C. for 16 minutes to obtain coatings with excellent physical properties.

EXAMPLE 9

Preparation of the oligomer described in Example 8 is repeated by employing 191 g of Epon 828 (Shell Chemical Co.) instead of the epoxy resin used therein.

Fifty six (56) parts of the above oligomer, 47 parts of Desmodur-N-100 (Mobay Chemical Co.) and 0.6 parts of dibutyltin dilaurate are dissolved in 38 parts of n-butyl acetate and the resulting formulation is applied by spraying to primed steel panels. The panels are baked at 110° C. for 17 minutes to obtain coatings with excellent physical properties.

EXAMPLE 10

Eight (8) parts of nonaqueous dispersion (42% solids by weight) prepared as described in Example A of U.S. Pat. No. 4,025,474, are included in the hydroxy component of Example 2. Forty three (43) parts of Desmodur-N-100 (Mobay Chemical Co.) and 0.5 parts dibutyltin dilaurate are dissolved in 24 parts of n-butyl acetate and this solution is added to the above mixture. The resulting formulation is applied by spraying to primed steel panels which are baked at 110° C. for 18 minutes to obtain silver metallic coatings with excellent physical properties.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications comprising:
 (A) a tetrahydroxy oligomer having a number average molecular weight of between about 600–2000 and being the reaction product of:
  (i) an ester containing pendant hydroxy and carboxyl functionality and being made by a reaction of reactants consisting essentially of:
   (a) a $C_3$–$C_{10}$ aliphatic branched diol, and
   (b) an alkyl hexahydrophthalic anhydride, wherein (a) and (b) are combined in the reaction mixture in an amount sufficient to allow reaction in about a 1:1 molar ratio; and
  (ii) a diepoxide having a number average molecular weight between about 130–1500, wherein (i) and (ii) are combined in the reaction mixture in an amount sufficient to allow reaction in about a 2:1 molar ratio;

(B) a polyisocyanate crosslinking agent;

(C) 0–50 weight percent based on the total weight of (A), (B), (C) and (D) of a hydroxy functional additive having a number average molecular weight ($\overline{M}_n$) between about 150–6000; and (D) solvent, said polyisocyanate crosslinking agent having two or more reactive isocyanate groups per molecule and being included in said composition in an amount sufficient to provide between about 0.50 and about 1.6 reactive isocyanate groups per hydroxyl group present in said composition either on said tetrahydroxy oligomer or as a hydroxyl group of said hydroxy functional additive.

2. A high solids coating composition according to claim 1, wherein said aliphatic branched diol contains one primary hydroxyl group.

3. A coating composition according to claim 2, wherein the hydroxyl groups of said diol are not attached to adjacent carbon atoms.

4. A coating composition according to claim 3, wherein said diol is 2-ethyl-1,3-hexane diol.

5. A coating composition according to claim 1, wherein the alkyl group of said alkyl hexahydrophthalic anhydride comprises a lower alkyl group having up to about seven carbons.

6. A coating composition according to claim 4 or 5, wherein said anhydride is methyl hexahydrophthalic anhydride.

7. A coating composition according to claim 1, wherein said diepoxide is selected from the group consisting of (i) condensation products of bisphenol-A with epichlorohydrin, (ii) ester type diepoxides, (iii) cycloaliphatic diepoxides, and (v) mixtures of (i)-(iii).

8. A coating composition according to claim 1, wherein said polyisocyanate crosslinking agent is included in said composition in an amount sufficient to provide between about 0.8 and about 1.3 reactive isocyanate groups per hydroxyl group in said composition.

9. A coating composition according to claim 1, wherein said polyisocyanate crosslinking agent is a diisocyanate.

10. A coating composition according to claim 1, wherein said polyisocyanate crosslinking agent has 3 or more reactive isocyanates per molecule.

11. A coating composition according to claim 10, wherein said polyisocyanate crosslinking agent is a trimerized product of an aliphatic diisocyanate.

12. A coating composition according to claim 11, wherein said polyisocyanate crosslinking agent is a trimerized reaction product of 1,6 hexamethylene diisocyanate.

13. A coating composition according to claim 10, wherein said polyisocyanate crosslinking agent is a polyisocyanate having a biuret structure.

14. A composition in accordance with claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)-(v).

15. A coating composition according to claim 1, wherein said composition is a high solids composition containing greater than about 60 percent by weight of nonvolatile solids.

* * * * *